Aug. 8, 1950        A. C. HOWARD        2,517,879
GEAR BOX
Filed Jan. 2, 1946        2 Sheets-Sheet 1
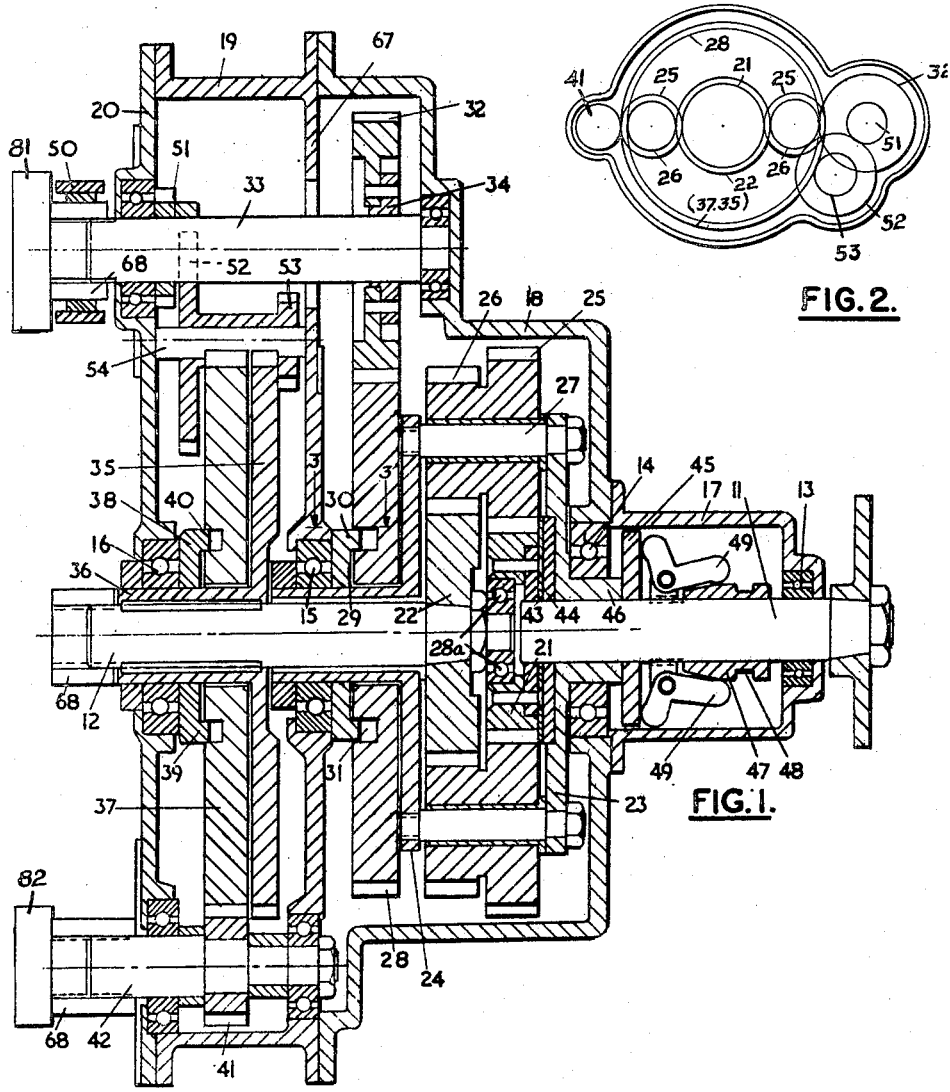
Inventor
Arthur C. Howard
by Mawhinney & Mawhinney
Attorneys Aug. 8, 1950 A. C. HOWARD 2,517,879
GEAR BOX Filed Jan. 2, 1946 2 Sheets-Sheet 2

INVENTOR
ARTHUR C. HOWARD
by Mawhinney & Mawhinney
ATTORNEYS

Patented Aug. 8, 1950

2,517,879

UNITED STATES PATENT OFFICE 2,517,879

GEAR BOX

Arthur Clifford Howard, Upminster, England, assignor of one-half to John Fowler & Co. (Leeds) Limited, Hunslet, England Application January 2, 1946, Serial No. 638,635
In Great Britain November 24, 1944

Section 1, Public Law 690, August 8, 1946
Patent expires November 24, 1964

7 Claims. (Cl. 74—686)

This invention relates to a change-speed mechanism of the kind including a three-element planetary gearing, a power regenerator connected to be driven by the reaction element of the gearing, and a booster motor arranged to be supplied from the regenerator and connected to drive the driven element of the gearing.

It is a principal object of the invention to provide such a change-speed mechanism, with means whereby the power regenerator and the booster motor are automatically disconnected in the appropriate conditions, so as to reduce transmission losses in direct drive.

A further object is to provide a construction of such a change-speed mechanism which is comparatively small, is robust, and of a simplicity that affords good facilities for servicing its components.

According to the invention, each of the drives between the reaction element and the regenerator, on the one hand, and the booster motor and the driven element on the other hand, includes a one-way-driving device; control means is provided for varying the operation of the regenerator for a given speed of the driving element; and, in addition, means is provided whereby the driving and driven elements can be clutched together. Thus, when the predetermined gear ratio between the driving and driven elements is reached the drive to the regenerator is automatically discontinued, and the booster motor in these conditions cannot be driven from the driven element.

The regenerator may be an electric generator in which event an electric motor is used as the booster motor, or, alternatively, the regenerator may be a pneumatic or an hydraulic pump and the booster motor be pneumatically or hydraulically driven respectively.

Preferably, provision is made for a reverse drive.

The invention is illustrated by the drawings. of which:

Figure 1 is a sectional plan of one form of the change-speed mechanism;

Figure 2 is a diagrammatic end view showing, to a reduced scale, the disposition of the various gears;

Figure 4:
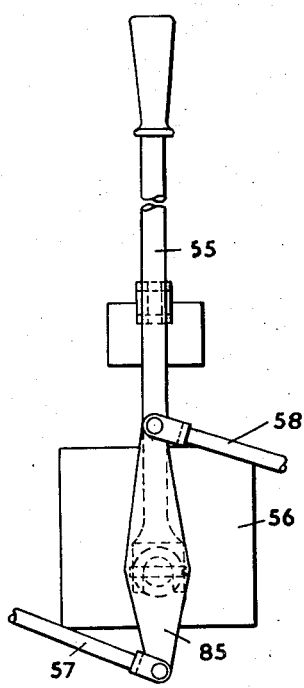
Figure 4 is a side elevation, to a reduced scale, of one form of control arrangement.

In the drawings, the input shaft 11 and output shaft 12 are supported coaxially within bearings 13, 14 and 15, 16, respectively, in a four-part casing 17, 18, 19, 20 and are provided with spur gears 21, 22 on their adjacent ends, the spur gear 21 on the input shaft being the smaller. The planet wheel carrier comprises two discs 23, 24, freely mounted on the two shafts, respectively, and supported, by coaxial bosses, within the bearings 14 and 15. One or more planet wheels, each stepped to provide two coaxial gears 25, 26 which mesh respectively with the gears 21, 22, are supported on spindles 27 fastened at their opposite ends in the discs 23, 24. It will thus be seen that the planet wheel carrier encloses the two spur gears 21, 22. Preferably, the inner end of the output shaft 12 is received in a bearing 28a which is spigoted into the adjacent face of the gear 21 on the input shaft.

A regenerator driving gear 28 is disposed concentrically and freely about the boss of the disc 24, and can be clutched to the latter by a freewheel device.

The free-wheel device, which may be of the ramp and ball, or any other suitable type, is shown as comprising a collar 29, fast with the boss of the disc 24, having cam projections 30 to engage balls or rollers 80 in a groove 31 in the wheel 28. The adjacent faces of the wheel 28 and the disc 24 are provided with friction members (also not shown) of any suitable kind, and the arrangement is such that during reverse rotation of the wheel 24 (and, consequently, of the collar 29) with respect to the shaft 11, the cam projections 30 and their coacting parts urge the wheel 28 axially into driving contact with the disc 24. When, however, the disc 24 rotates in the same sense as the shaft 11 the cam projections 30 and their coacting parts relieve the axial pressure on the wheel 28 and thus break down the driving contact with the disc 24.

The regenerator driving gear 28 meshes permanently with a driven gear 32 fast with the regenerator shaft 33. The regenerator is diagrammatically indicated at 81. As shown, the gear 32 is riveted to a flange 34 which is welded to the shaft.

A disc 35 with an axial boss 36 is keyed by the latter to the output shaft 12, and a booster-motor-driven gear 37 is freely and concentrically supported on the boss 36.

The gear 37 is operatively connected to the shaft 12 by a free-wheel device, which is similar to that previously described, comprising a collar 38 which is fast with the boss 36 and which has cam projections 39, a groove 40 in the wheel 37, and friction members (not shown) on the adjacent faces of the wheel 37 and disc 35. The gear 37 is permanently in mesh with a driving gear 41 on the booster motor shaft 42. The booster motor is diagrammatically indicated at 82.

For clutching the shafts 11 and 12 together for providing a direct drive, the gear 21 (which is shown secured to its shaft in the same way as the gear 32) and the disc 23 are provided with friction members 43, 44, and the disc 23 has a thrust plate 45 fast with its boss 46. An actuating sleeve 47, having a groove 48 for the reception of an actuating fork (not shown), has a conical nose which can coact with bell-crank levers 49 (which are pivoted in brackets fast with the shaft 11) and urge them into contact with the plate 45 so as to displace the disc 23 axially into driving contact with the wheel 21 and thus lock the epicyclic gear. A return spring (not shown), which can react between the adjacent faces of the plate 45 and the inner ring of the bearing 14, is provided.

The arrangement thus far described is such that when the output shaft 12 is at rest, the planet wheel carrier revolves in the reverse direction to the input shaft 11 and drives the regenerator through the gear pair 28, 32, one free wheel device 30 being locked in those conditions. The power taken to drive the regenerator is manifested as a reaction that causes the planet wheel carrier to urge the output shaft in the same direction as the input shaft, and the power absorbed by the regenerator is regenerated and conveyed to the booster motor from whence it is applied at a lower ratio to the output shaft.

As the output shaft accelerates with reference to the input shaft, the rearward rotation of the planet wheel carrier decelerates, and a higher proportion of the power is transmitted to the output shaft through the epicyclic gear, the proportion of the input power absorbed by the regenerator and relayed to the booster motor decreasing correspondingly. During this phase, the reaction of the regenerator ensures that the gear 28 and the disc 24 are maintained in driving engagement, the drag of the regenerator ensuring driving engagement of the free wheel device 30.

When the output shaft attains a speed, on normal or light load, at which the planet wheel carrier is rotating rearwardly at its minimum speed, the clutch 43, 44 can be engaged to raise the speed of the shaft 12 to that of the shaft 11. As soon as the rearward rotation of the planet wheel carrer is arrested and it commences to rotate in the same direction as the shaft 11, the free-wheel device in the regenerator drive operates to discontinue said drive so as to relieve the system of the effort of driving the regenerator and also to protect the latter from the effects of being driven needlessly. During this phase, as soon as the shaft 12 overtakes the drive from the booster motor, the latter drive is disconnected by its associated free-wheel device 40.

In instances where the regenerator is an electric generator, the generator is of the shunt-wound type, and its reaction torque can be adjusted by including a rheostat in its field windings. In this case, the booster motor is a series-wound electric motor capable of taking all the current generated and capable of producing a very high torque at low output shaft speeds; this torque falling off as the speed of the output shaft increases and that of the generator decreases.

Similarly, when the regenerator is a pneumatic or hydraulic pump, the effect of the pump can be modified to suit changing circumstances encountered in use, by the provision of regulating valves. Such pneumatic or hydraulic systems are preferably of the closed type.

Whether the regenerator be electric, hydraulic, or pneumatic, a mechanical brake (such as the band brake indicated at 50) to increase its loading may be provided in addition to the rheostat or valves referred to. This brake can be used to lock the shaft 33, when the regenerator drive has been discontinued by the operation of the associated free-wheel device, so as to transmit power from the shaft 11 to the shaft 12 at the ratio determined by the epicyclic gear.

According to one design of the change-speed mechanism (particularly for use on heavy vehicles) the wheel 21 has 30 teeth, the wheel 22 has 36 teeth, and the steps 25, 26 of the planet wheels (two of which wheels are provided) have 24 and 18 teeth respectively. Thus, when the shaft 11 is rotating at 1,000 R. P. M. and the shaft 12 is at rest, the planet wheel carrier will rotate at 1,666 R. P. M. in the opposite direction to the driving shaft 11. Also, when the planet wheel carrier comes to rest, with the shaft 11 running at 1,000 R. P. M., the shaft 12 will run at 625 R. P. M. The speed range of the carrier is, therefore, from 1,666 R. P. M. to zero. The gear 28 has 72 teeth, and the gear 32 on the regenerator shaft has 36 teeth. With the shaft 11 running at 1,000 R. P. M., therefore, the speed range of the regenerator is from 3,332 R. P. M. to zero whilst the shaft 12 accelerates from zero to 625 R. P. M. It will be seen that with this design the booster motor functions until the output shaft has speeded up to about two-thirds of the input shaft speed.

A reverse gear can be provided by forming the disc 35 as a spur wheel, keying a gear wheel 51 to the regenerator shaft 33, and interposing a pair of gears 52 and 53 which can be slid along a stub shaft 54, into engagement with them. During reverse drive, the disc 35 is driven in the direction that frees the free-wheel device associated with the booster motor.

Figure 5:
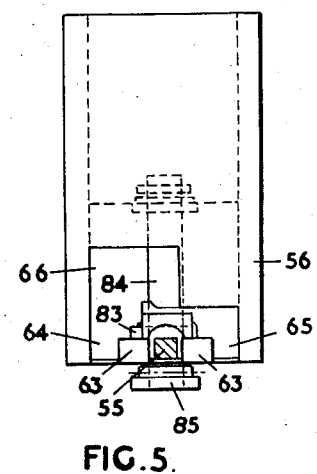
Figure 5 is a plan view of the gate shown in Figure 4.
Figure 3:
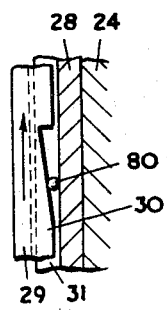
Figure 3 is a fragmentary sectional plan of one of the free-wheel devices, the view being on the line 3—3 of Figure 1.
Figure 6:
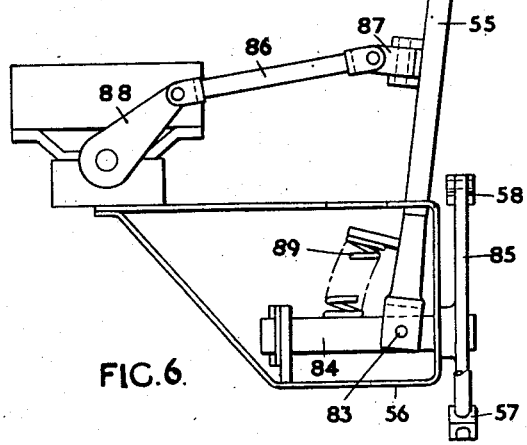
Figure 6 is an elevation from the left of Figure 4.

The various controls, referred to above, are preferably operable by the movement of a single control lever. Such an arrangement is diagrammatically illustrated by Figures 4 to 6, in which the control lever 55 has a trunnion connection at 83 with a pivot pin 84 which is rotatably supported in the bracket 56 secured to the change-speed mechanism casing. A double-ended lever 85, fast with the pin 84, is connected by operating rods 57, 58 (which may be adjustable), for operating the clutch 43, 44, and the brake 50. The control lever 55 is also connected, through a link 86, and universal joint 87, to an actuating arm 88 which, when the lever 55 is moved laterally operates in one direction, the rheostat or equivalent device, for the regenerator against a return spring 89. A gate, see Figure 5, through which the lever 55 projects, is provided with a neutral notch defined between the cheeks 63, with notches 64 and 65 respectively for holding the clutch 43, 44 and brake 50 engaged, and with a lateral bay 66 for permitting the lever 55 to be moved for adjusting the rheostat. The return spring 89 holds the lever 55 engaged in the selected notch.

To drive a vehicle fitted with this design of change-speed mechanism, one first starts up the engine, and to move the vehicle, adjusts the regenerator control (that is, the rheostat or valve, according to the nature of the regenerator, by moving the control lever 55 laterally, to apply a sufficient reaction from the regenerator to oppose free rotation of the planet carrier 24 (through the gear pair 28, 32 and the free-wheel device—which is locked in these conditions) and thus to load the engine the required amount to give the desired acceleration. When the output shaft 12 has accelerated to approximately five-eighths of the input shaft speed (under the combined efforts of the mechanical drive through the gears 21, 25, 26 and 22 and of the by-passed drive through the regenerator and booster motor) one engages the clutch 43, 44 to provide a direct drive from the shaft 11 to the shaft 12 at unitary ratio, the regenerator and booster motor then being disconnected by the operation of the free-wheel devices. If the circumstances are such as would cause a shock to be experienced upon engagement of the clutch, the engine can be decelerated slightly. Should a hill be encountered, necessitating a lower gear ratio to enable the engine to take the load, one disconnects the direct drive by disengaging the clutch 43, 44 and increases the load on the regenerator by passing the full current through the rheostat or by restricting the passage of the pneumatic or hydraulic medium by adjusting the valve. This will cause the regenerator to offer sufficient resistance to hold the planet wheel carrier almost stationary so as to permit the power to be transmitted almost entirely mechanically through the epicyclic gear alone, at approximately five-eighths ratio, the brake 50 can then be applied to hold the regenerator stationary. If a still lower ratio is required, one releases the brake and reduces the loading on the regenerator (so that the latter will offer a less resistance to the rotation of the planet wheel carrier). This allows the engine to handle the load comfortably as the regenerator then by-passes some of the applied power to the output shaft 12 through the booster motor and reduction gear.

In practice, for vehicles, it is found that the infinitely variable gear according to the above design, gives the requisite high starting torque for heavily laden vehicles, and that when the output shaft has been speeded up to approximately two-thirds engine speed (which is equivalent to third gear ratio in normal car or heavy vehicle practice), the vehicle can be handled more successfully on direct drive with the regenerator and booster cut out.

The change-speed mechanism can conveniently be constructed with its casing in two main parts 18, 19, and the detachable cap 17. The part 18 houses the shaft 11 and the adjacent end of the shaft 12, together with the epicyclic gear and the free-wheel drive for the regenerator, the bearings for the shafts being housed in the casing part. The part 18 is open at the side where it is connected to the part 19 so that, when removed therefrom, there is good access to the parts it contains. The part 19, which has an integral wall 67 where it meets the part 18, has a removable cover 20 at its opposite end and houses the booster motor drive and the reverse gear. The end wall 67 and the cover 20 carry the bearings for the shafts. The regenerator shaft 33 and the booster motor shaft 42 project through the cover 20, and the regenerator 81 and the booster motor 82 are situated outside the casing so as to be fully accessible for servicing and removed from possible harm, particularly if they are electrical, from the gear box oil. Conveniently, the shafts 33 and 42 are divided, one portion of each being fast with the respective component, and the two parts of each shaft being united by a splined sleeve 68. The shaft 12 is preferably treated in the same way.

This arrangement of the components is very economical of space, and the designing of the change-speed mechanism for transmitting increased power mainly involves an increase in the distance between the end wall of the part 18 and the cover 20 sufficient to accommodate gear wheels of increased thickness.

Although the application of the change-speed mechanism, according to the invention, to vehicles has only been described, it is obvious that it has other applications.

What I claim as my invention and desire to secure by Letters Patent of the United States is:

1. A change-speed mechanism including a driving element, a driven element, and a reaction element interconnecting said driving and driven elements to form a planetary gearing, a power regenerator, a one-way driving device by which said reaction element is connected to drive said regenerator, control means for varying the operation of said regenerator for a given speed of said driving element, a booster motor, means for supplying motive power from said regenerator to drive said booster motor, a one-way driving device by which said booster motor is connected to drive said driven element, and clutch means operable to lock said driving and driven elements together when they are rotating at an appropriate relative speed.

2. A change-speed mechanism including a driving element, a driven element, and a reaction element interconnecting said driving and driven elements to form a planetary gearing, a power regenerator, a one-way driving device and a speed-increasing gearing by which said reaction element is connected to drive said regenerator at more than unit ratio, control means for varying the operation of said regenerator for a given speed of said driving element, a booster motor, means for supplying motive power from said regenerator to drive said booster motor, a one-way driving device and a speed-reduction gearing by which said booster motor is connected to drive said driven element at less than unit ratio, and clutch means operable to lock said driving and driven elements together when they are rotating at an appropriate relative speed.

3. A change-speed mechanism including a driving element, a driven element, and a reaction element interconnecting said driving and driven elements to form a planetary gearing, a shaft, a power regenerator fast on said shaft, a one-way driving device by which said reaction element is connected to drive said regenerator, control means for varying the operation of said regenerator for a given speed of said driving element, a booster motor, means for supplying motive power from said regenerator to drive said booster motor, a one-way driving device by which said booster motor is connected to drive said driven element, clutch means operable to lock said driving and driven elements together when they are rotating at an appropriate relative speed, and a reversing gearing operable to interconnect said shaft and said driven element for providing a reverse drive for said driven element, the latter then being freed from the booster motor owing to the operation of the respective said one-way driving device.

4. A change-speed mechanism including an input shaft with a sun wheel fast thereon, a coaxial output shaft with a larger sun wheel fast thereon, stepped planet wheels meshing both said sun wheels, a rotary carrier for said planet wheels, a power regenerator, a speed-increasing gear pair, a one-way driving device by which said carrier is connected to drive said regenerator through said gear pair, control means for varying the operation of said regenerator for a given speed of said input shaft, a booster motor, means for supplying motive power from said regenerator to drive said booster motor, a speed-reduction gear pair, a one-way driving device by which said booster motor is connected to drive said output shaft through said speed-reduction gear pair, and clutch means operable to lock said input and output shafts together when they are rotating at an appropriate relative speed.

5. A change-speed mechanism including a driving element, a driven element, and a reaction element interconnecting said driving and driven elements to form a planetary gearing, a speed-increasing gear pair of which the larger gear is coaxial and free with respect to said reaction element, a clutch member fast with said reaction element, a coacting clutch member fast with said larger gear, cam means rendered operable by relative rotation of said reaction element and said larger gear in one direction to move the latter axially for engaging said clutch members, said cam means permitting disengagement of said clutch members when the direction of said relative rotation is reversed, a power regenerator connected to be driven by the smaller gear of said gear pair, control means for varying the operation of said regenerator for a given speed of said driving element, a booster motor, means for supplying motive power from said regenerator to drive said booster motor, a speed-reduction gear pair of which the smaller gear is driven by said booster motor and of which the larger gear is coaxial and free with respect to said driven element, a clutch member fast with said driven element, a coacting clutch member fast with said larger speed-reduction gear, cam means rendered operable by relative rotation of said driven element and said larger speed-reduction gear in one direction to move the latter axially for engaging said second-mentioned clutch members, said cam means permitting disengagement of said second-mentioned clutch members when the direction of relative rotation of said driven element and said larger speed-reduction gear is reversed, and clutch means operable to lock said driving and driven elements together when they are rotating at an appropriate relative speed.

6. A change-speed mechanism including a driving element, a driven element, and a reaction element interconnecting said driving and driven elements to form a planetary gearing, a brake for said reaction element, a power regenerator, a one-way driving device by which said reaction element is connected to drive said regenerator, control means for varying the operation of said regenerator for a given speed of said driving element, a booster motor, means for supplying motive power from said regenerator to drive said booster motor, a one-way driving device by which said booster motor is connected to drive said driven element, clutch means operable to lock said driving and driven elements together when they are rotating at an appropriate relative speed, a universally pivoted control rod, a connection between said clutch means and said control rod whereby when the latter is near one end of a linear movement the clutch is operated to lock said driving and driven elements together, a connection between said brake and said control rod whereby when the latter is near the opposite end of said linear movement said brake is applied to lock said reaction element, and a connection between said control means and said control rod whereby when the latter is moved laterally of the direction of said linear movement said control means is actuated to vary the operation of said regenerator.

7. A change-speed mechanism, according to claim 1, comprising a casing formed in three separable coaxial parts, each said casing part having an axially directed peripheral wall, a radial wall on one corresponding end, and being open at the other end, so that the open ends of the first and second casing parts are closed, respectively, by the radial walls of the second and third, and a closure plate for the open end of the third casing part; operating mechanism for said clutch means contained in said first casing part, the said second casing part containing said planetary gearing and said one-way driving device for said regenerator, and the said third casing part containing said one-way driving device from said booster motor, a driving shaft for said driving element, bearings for said driving shaft supported by the said radial walls of the said first and second casing parts, a shaft connected to be driven by said driven element, a shaft fast with said booster motor, bearings for said driven-element-shaft and for said booster motor shaft supported by the said closure plate and the said radial wall of the said third part, a shaft fast with said regenerator, bearings for said regenerator shaft supported in the said closure plate and the said radial wall of the said second casing part, and a bearing, supported spigotally within the inner end of said driving shaft, for the adjacent end of said driven-element-shaft, the juncture of said shafts being disposed within said second casing part.

ARTHUR CLIFFORD HOWARD.

REFERENCES CITED

The following references are of record in the file of this patent:

UNITED STATES PATENTS

| Number | Name | Date |
|---|---|---|
| 436,127 | Edison | Sept. 9, 1890 |
| 948,436 | Thomas | Feb. 8, 1910 |
| 1,076,614 | Thomas | Oct. 21, 1913 |
| 1,574,383 | Fraser | Feb. 23, 1926 |
| 1,671,033 | Kimuva | May 22, 1928 |
| 1,992,210 | Higley | Feb. 26, 1935 |
| 2,000,465 | Higley | May 7, 1935 |
| 2,363,201 | Popoff | Nov. 21, 1944 |

FOREIGN PATENTS

| Number | Country | Date |
|---|---|---|
| 500,833 | France | Mar. 26, 1920 |